US 8,776,258 B2

(12) United States Patent
Linsley

(10) Patent No.: US 8,776,258 B2
(45) Date of Patent: Jul. 8, 2014

(54) PROVIDING ACCESS RIGHTS TO PORTIONS OF A SOFTWARE APPLICATION

(76) Inventor: David J. Linsley, Seattle, WA (US)

(*) Notice: Subject to any disclaimer, the term of this patent is extended or adjusted under 35 U.S.C. 154(b) by 1407 days.

(21) Appl. No.: 11/765,573

(22) Filed: Jun. 20, 2007

(65) Prior Publication Data

US 2008/0320601 A1    Dec. 25, 2008

(51) Int. Cl.
*G06F 21/10* (2013.01)
(52) U.S. Cl.
USPC .............................................. 726/28; 726/26
(58) Field of Classification Search
USPC ........... 726/28, 2–27; 713/150–153, 168–171
See application file for complete search history.

(56) References Cited

U.S. PATENT DOCUMENTS

| | | | |
|---|---|---|---|
| 5,420,924 A * | 5/1995 | Berson et al. ................. | 713/186 |
| 5,666,411 A | 9/1997 | McCarty ........................... | 380/4 |
| 5,675,633 A * | 10/1997 | Kopp et al. ................. | 379/88.07 |
| 6,108,733 A * | 8/2000 | Porterfield ..................... | 710/104 |
| 6,128,740 A * | 10/2000 | Curry et al. .................... | 713/158 |
| 6,188,995 B1 | 2/2001 | Garst et al. ....................... | 705/59 |
| 6,226,629 B1 * | 5/2001 | Cossock ............................. | 1/1 |
| 6,643,775 B1 | 11/2003 | Granger et al. ............... | 713/190 |
| 6,824,051 B2 | 11/2004 | Reddy et al. ................... | 235/380 |
| 7,017,189 B1 | 3/2006 | DeMello et al. ................ | 726/26 |
| 7,135,890 B2 * | 11/2006 | Chang ........................... | 326/101 |
| 7,149,721 B1 * | 12/2006 | Sites et al. ....................... | 705/59 |
| 7,158,953 B1 | 1/2007 | DeMello et al. ................... | 75/51 |
| 7,162,451 B2 * | 1/2007 | Berger et al. .................... | 705/51 |
| 7,209,922 B2 * | 4/2007 | Maze et al. .......................... | 1/1 |
| 7,362,983 B2 * | 4/2008 | Moroi ............................. | 399/80 |
| 7,761,908 B2 * | 7/2010 | Yokoyama ......................... | 726/4 |
| 8,051,299 B2 * | 11/2011 | Saunier .......................... | 713/187 |
| 2002/0091645 A1 * | 7/2002 | Tohyama ......................... | 705/59 |
| 2003/0051159 A1 * | 3/2003 | McCown et al. ............. | 713/201 |
| 2004/0098348 A1 * | 5/2004 | Kawasaki et al. ............... | 705/59 |
| 2005/0114672 A1 * | 5/2005 | Duncan et al. ................ | 713/182 |
| 2005/0138432 A1 * | 6/2005 | Ransom et al. ............... | 713/201 |
| 2005/0216413 A1 * | 9/2005 | Murakami et al. .............. | 705/51 |
| 2005/0278187 A1 | 12/2005 | Bobbitt .............................. | 705/1 |
| 2005/0289656 A1 * | 12/2005 | Yokoyama ..................... | 726/27 |

(Continued)

OTHER PUBLICATIONS

Jaeger, T. et al., "Flexible Control of Downloaded Executable Content", *ACM Transactions on Information and System Security*, 1999, 2(2), 177-228.

(Continued)

*Primary Examiner* — Eleni Shiferaw
*Assistant Examiner* — Phy Anh Vu
(74) *Attorney, Agent, or Firm* — Tony Azure; Andrew Sanders; Micky Minhas

(57) ABSTRACT

Techniques for providing access rights to different portions of a software application to one or more authorized users are described herein. An issuance license may be inserted into the software application that divides the software application into one or more portions and identifies, for each portion, one or more users that are authorized access to the portion. Each portion of the software application may then be encrypted using, for example, a different cryptographic key. When the software is executed, an end user license may then be requested that corresponds to a particular user and that entitles the particular user access to each portion of the software application that the issuance license identifies the particular user as being authorized to access. The end user license may then be used to decrypt each portion of the software application that the issuance license identifies the particular end user as being authorized to access.

13 Claims, 3 Drawing Sheets

(56) References Cited

U.S. PATENT DOCUMENTS

| | | | | |
|---|---|---|---|---|
| 2006/0064488 | A1 | 3/2006 | Ebert | 709/225 |
| 2006/0230458 | A1* | 10/2006 | Saeki et al. | 726/26 |
| 2007/0074270 | A1 | 3/2007 | Meehan et al. | 726/2 |
| 2012/0109673 | A1* | 5/2012 | Pitroda et al. | 705/1.1 |

OTHER PUBLICATIONS

Kohno, T. et al., "On the Global Content PMI: Improved Copy-Protected Internet Content Distribution", *Financial Cryptography, 5$^{th}$ International Conference*, 2001, 12 pages, http://cs.washington.edu.

Park, J. et al., "Towards Usage Control Models: Beyond Traditional Access Control", *SACMAT*, Jun. 3-4, 2002, 8 pages, http://www.list.gmu.edu.

Yu, Y. et al., "Enterprise Digital Rights Management: Solutions against Information Theft by Insiders", Experimental Computer Systems Lab, Computer Science Department, http://www.ecsl.cs.sunysb.edu, 26 pages.

\* cited by examiner

PROVIDING ACCESS RIGHTS TO PORTIONS OF A SOFTWARE APPLICATION

BACKGROUND

It is common to use cryptography to protect or hide sensitive data found in software from being seen or used by third parties. For example, Information Rights Management (IRM) is a feature found in the Office® software package from Microsoft Corp. of Redmond, Wash. IRM can help prevent sensitive information from being distributed to or read by persons who do not have permission rights to access the content of the sensitive information. As another example, the Outlook® application, included in aforementioned Office® software package, enables users to create and send e-mail messages with restricted permission to help prevent messages from being forwarded, printed, or copied and pasted. Documents, workbooks, and presentations that are attached to messages with restricted permission are automatically restricted as well.

Sometimes, in addition to data that is found in software, the actual software product itself can be highly sensitive, such as, for example, in the case of software tools for Digital Rights Management (DRM) software systems. With the increased complexity of software products, it is becoming more difficult to control access to software products which may have many portions/sections, some of which are very sensitive to some users and some which may not be sensitive at all to other users.

SUMMARY

Techniques for providing access rights to different portions of a software application to one or more authorized users are described herein. An issuance license may be inserted into the software application that divides the software application into one or more portions and identifies, for each portion, one or more users that are authorized access to the portion. Each portion of the software application may then be encrypted using, for example, a different cryptographic key.

When the software is executed, the issuance license may be located. An end user license may then be requested that corresponds to a particular user and that entitles the particular user access to each portion of the software application that the issuance license identifies the particular user as being authorized to access. The end user license may then be used to decrypt each portion of the software application that the issuance license identifies the particular end user as being authorized to access.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

Figure 1:
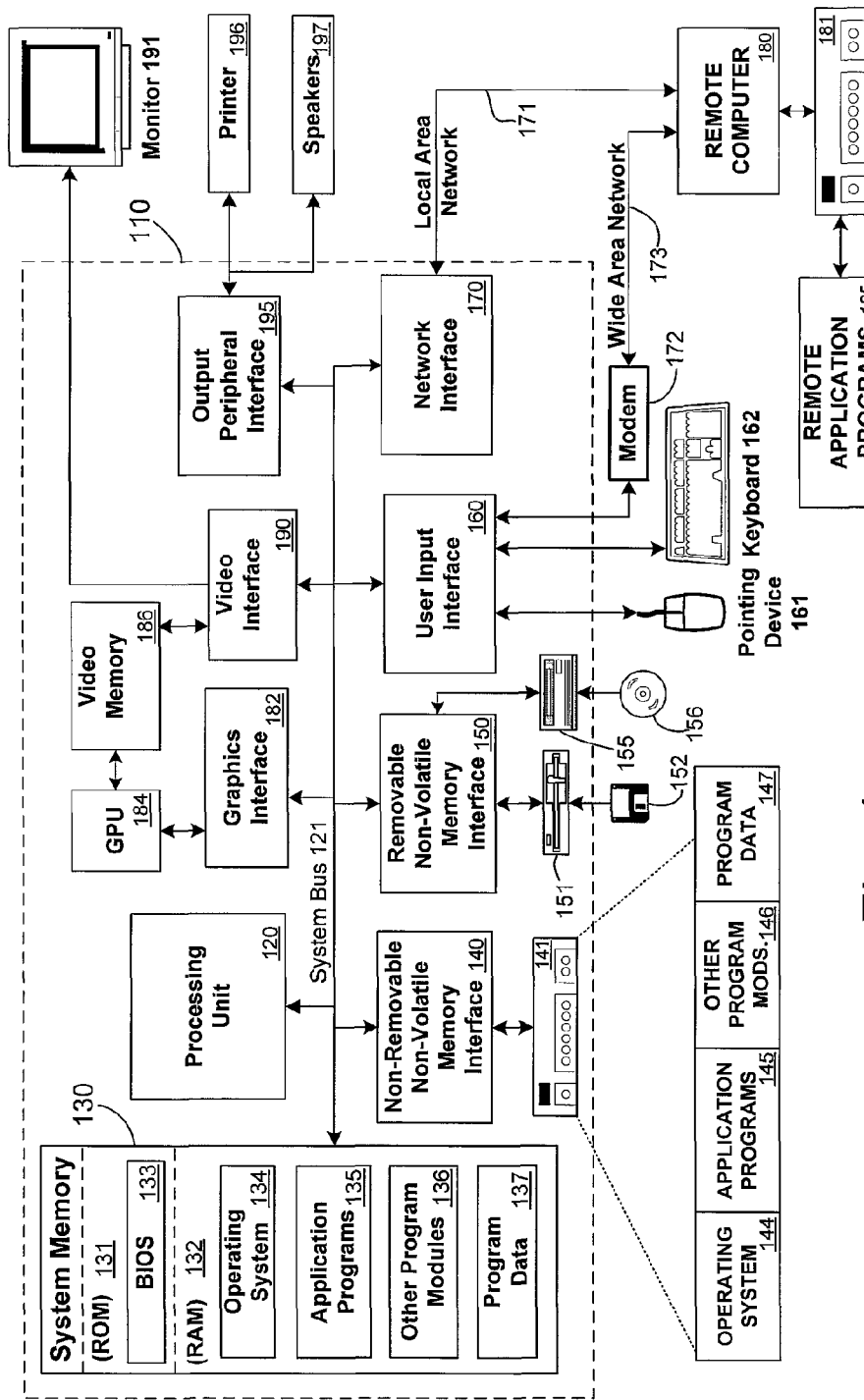
FIG. 1 is a block diagram representing an exemplary computing device.

FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Rights privileged software may be generated by taking as an input a configuration file including rights management settings, or display a user interface for an operator to enter rights management settings. The rights management settings may contain information regarding how the rights privileged software is to be processed, and a list of principals who have rights to use particular portions of the software product. This can range from all of the software product down to particular portions, such as particular functions or features, within the software product, all with different principals if required.

In accordance with an illustrative embodiment, existing technologies that encrypt executable software code and decrypt on runtime may be used. Such technologies may employ various existing cryptographic key or any other appropriate encryption mechanisms. Before the software is distributed, an issuance license (IL) is generated that states which specific authorized principals, or all members of a distribution list, as examples, may use the software or portions of the software, and what the cryptographic key is to decrypt the software that is ready for execution.

The executable is then processed such that it is encrypted, the IL is inserted, and the logic to perform the rights check and decrypt the software is injected. Upon execution, the software takes out the issuance license and requests the End User License (EUL) from a rights management system. The rights management system may be remote or may be cached locally for performance gains on future runs. The EUL may then be bound to the software, and one or more cryptographic keys in the EUL may be used to decrypt one or more encrypted portions of the executable. Although an EUL is used in this embodiment, other types of access documents may be employed alternatively or in addition to an EUL depending on the specific design requirements. After decrypting one or more accessible portions of the software, control is passed to the decrypted software. Once execution of the decrypted software has completed, it may be re-encrypted, and then control is returned to the software.

Figure 2:
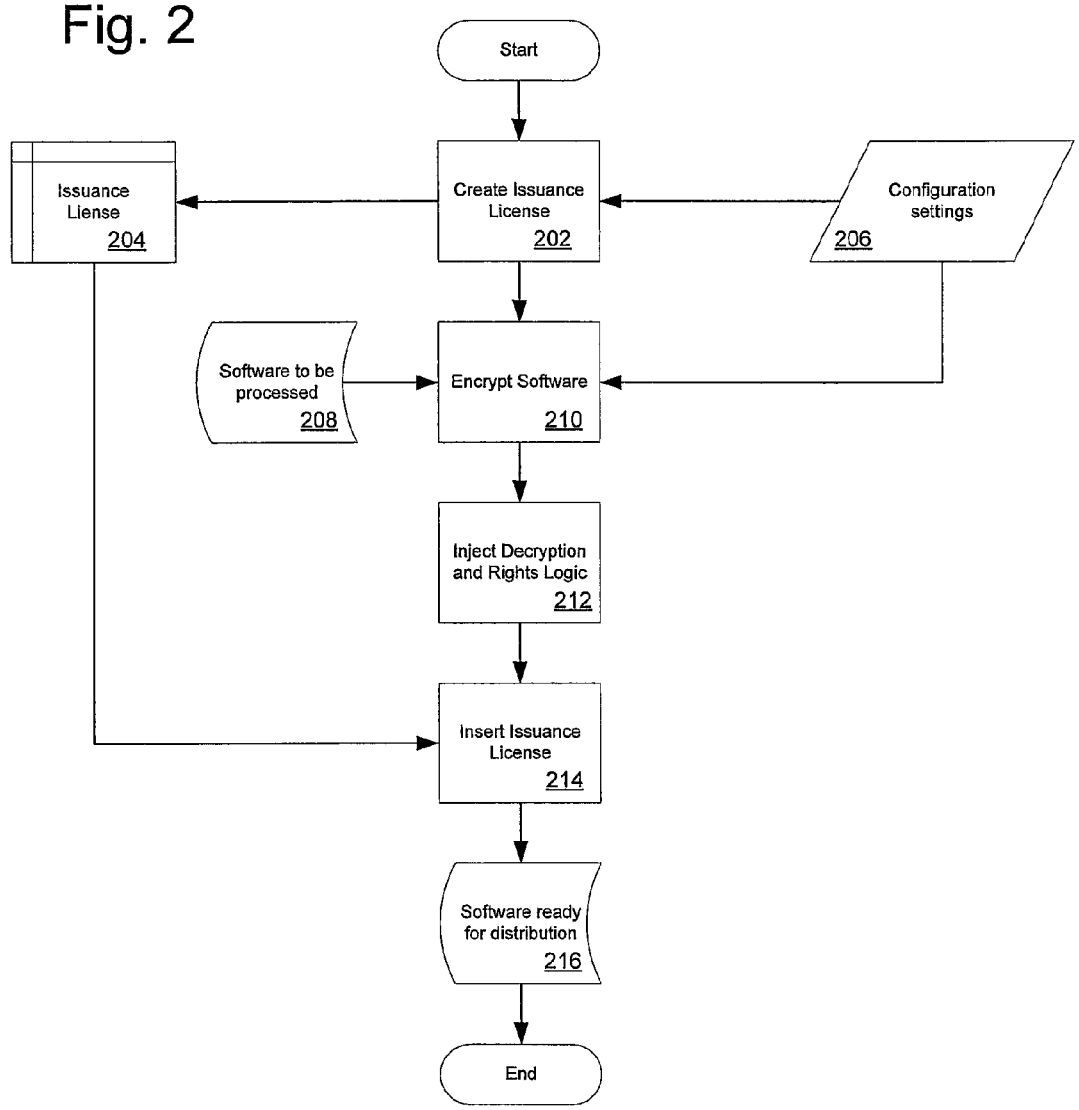
FIG. 2 is a flow diagram representing an exemplary method for generating a rights privileged software application.

Referring now to FIG. 2, there is shown flow diagram representing an exemplary method for generating a rights privileged application in accordance with an exemplary embodiment. At act 202, an issuance license 204 is generated from the configuration settings 206. As previously mentioned, the configuration settings may be entered via a pop-up screen or other entry tool which may be controlled by an authorized software administrator or other such person. Access to the configuration settings may be secured (i.e., encrypted, password protected, etc.) such that only authorized personnel can have access to the settings and be able to modify, add or delete the settings given their secure nature.

A cryptographic key is chosen to encrypt the software to be processed 208. Depending on the specific application, the cryptographic key can be per software function or the same key for all of the software product, or anywhere in-between. The number of cryptographic keys that are used may depend on the number of portions of the software that need to be secured and the number of users that the portions need to be secured from. This of course may differ depending on the particular security features that need to be implemented in the software product. At act 210, the software is then encrypted using the one or more cryptographic keys. The software is analyzed based on the configuration settings to find each area that needs to be protected, and those areas of the software are encrypted using the appropriate cryptographic key.

At act 212, logic to check rights and decrypt encrypted portions is injected into the software. The logic provides access to software code to handle a request for a new End User License (EUL), decryption of the software, and/or the transfer of control to the decrypted software once authorization and decryption is complete. The injected logic may be referred to as "non-encrypted" because the portion of the software that performs the above listed functions will not always be encrypted. In one embodiment, the software code that implemented this logic may expose an application programming interface (API) for the software to further request whether particular principals also have rights to use a particular function or feature in the software, and to enquire whether that function is actually decrypted or still encrypted. At act 214, the issuance license 204 is then added to the processed software. The software is ready for distribution in 216. Once the software has been distributed, executing the software can be attempted by the end user.

Figure 3:
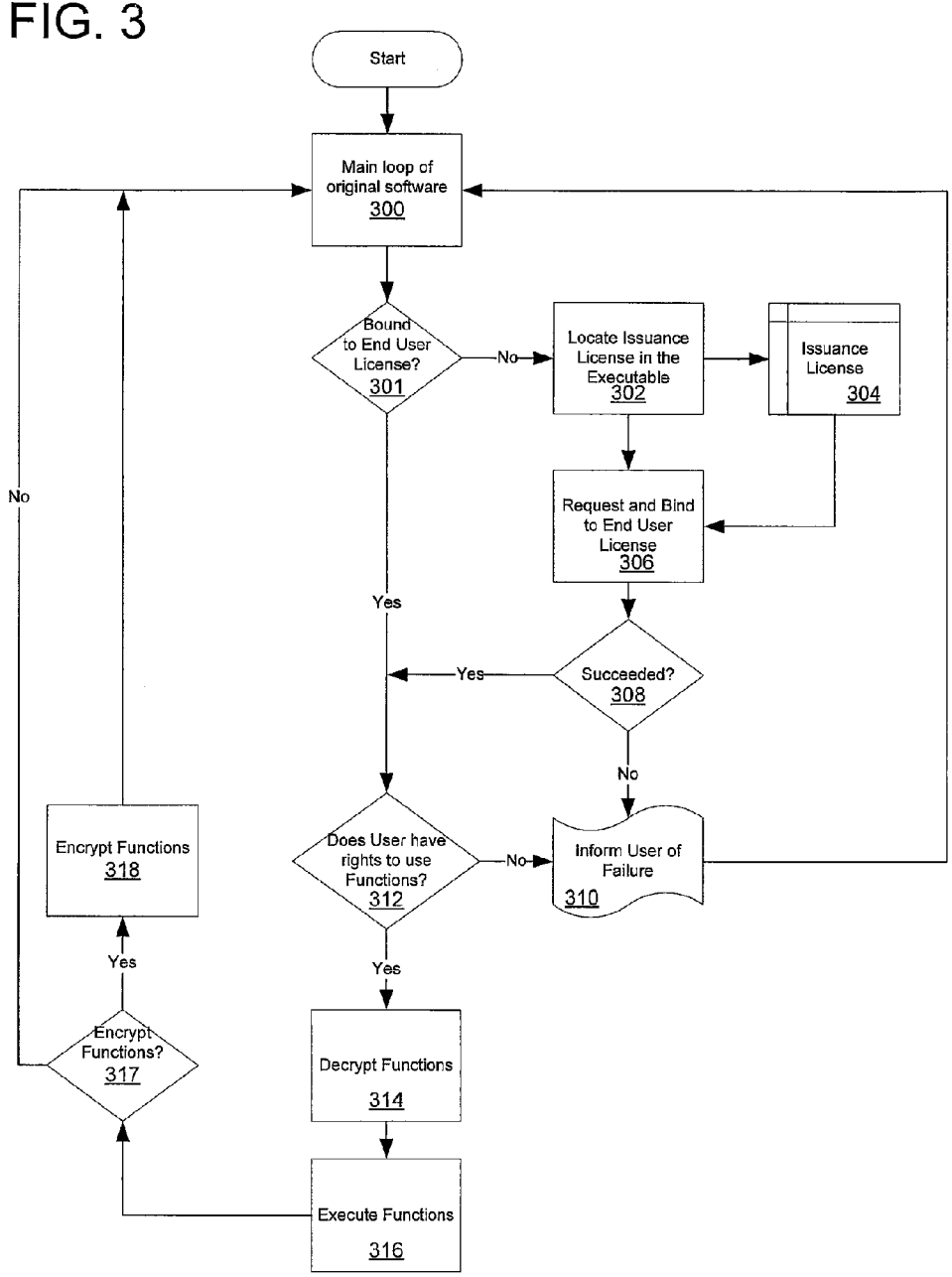
FIG. 3 is a flow diagram representing an exemplary method for executing a rights privileged software application.

A flow diagram representing an exemplary method for executing a rights privileged software application is shown in FIG. 3. When the software is loaded by the computer system's 100 operating system (OS) 144, execution of the software initiates at act 300 from the main loop of the original software. At act 301, it is determined whether the software is bound to an End User License (EUL). If the software is not yet bound, then injected logic is called during execution and the issuance license 304 is located at act 302. At act 306, the issuance license 304 is used to request an End User License (EUL) for a rights management system, and the EUL is then bound to the software application and the current end user or principal at act 306.

In certain circumstances, the EUL may not to able to be obtained from the rights management system. This may occur, for example, if the end user is not authorized to use any portions of the software application. In decision act 308, if the EUL cannot be obtained, then the user would be informed of the error/failure condition in act 310. The user can be informed of the error condition in 310 by an error window appearing on the computer monitor 191 or some other form of message such as, for example, an audio message through speakers 197.

At act 312, it is determined whether the user has rights to access particular functions within the executable. If the user does not have rights, then the user would be informed of the error/failure condition in act 310. If the user does have rights, then, at act 314, the functions are decrypted and, at act 316, the functions are executed. If an application programming interface (API) was exposed by the injected logic, the software can call it at act 312 to verify whether a particular function can be decrypted and executed or not. At act 317, it is determined whether or not the decrypted functions are to be re-encrypted, and, if so, then the functions are re-encrypted at act 317.

In some embodiments, the software may be tied to one or more principals. Software processed with the system above can be passed on to other users to run, but only those users who are authorized may execute the encrypted portions of the software. In another embodiment, authorization of who can use the software can be centrally managed. For example, a distribution list for use of the software can be authorized, and users can be added and removed from the distribution list as needed. Another feature that can be added is a revocation feature, whereby the software fails to operate once a user is no longer authorized to use the software. This feature differs from previous techniques in which the software continues to operate as long as a user has a token (i.e., CD, DVD, dongle, etc.) to use the software.

In still another embodiment, different parts of the software product can be licensed to different users. In an illustrative example of this embodiment, every user with license A can use everything in the software product except features X and Y, and only users with licenses to features X and Y can use those features within the software product. This solution differs from previous "all-or-nothing" approaches in which users could only enable the entire executable or no portion of the executable.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer readable medium, where the medium is not a signal, having stored thereon computer executable instructions for:

locating an issuance license within a software application, the issuance license dividing the software application into a plurality of portions and identifying, for each portion, each user that is authorized to access the portion, wherein each portion includes a function within the software application;

requesting, from a rights management system, an end user license comprising one or more cryptographic keys and corresponding to a first user and entitling the first user to access each portion of the software application that the issuance license identifies the first user as being authorized to access, wherein the issuance license is used to request the end user license; and using the end user license to decrypt each portion of the software application that the issuance license identifies the first user as being authorized to access.

2. The computer readable medium of claim 1 having stored thereon further computer executable instructions for calling injected logic to check rights associated with the software application.

3. The computer readable medium of claim 1 having stored thereon further computer executable instructions for calling injected logic to decrypt the software application.

4. The computer readable medium of claim 1 wherein an application programming interface is exposed for the software application to further request whether the first user has rights to access a particular function or feature in the software application.

5. A computer readable medium, where the medium is not a signal, having stored thereon computer executable instructions for:
- generating an issuance license that divides a software application into a plurality of portions and identifies, for each portion, each user that is authorized to access the portion, wherein each portion includes a function within the software application;
- encrypting each portion of the software application using a different cryptographic key; and
- inserting the issuance license into the software application, wherein the issuance license is used to request a single end user license that is used to decrypt each portion of the software application that the issuance license identifies a first user as being authorized to access, the single end user license issued by a rights management system and comprising one or more cryptographic keys.

6. The computer readable medium of claim 5 having stored thereon further computer executable instructions for injecting logic to check rights associated with the software application and to decrypt the software application.

7. The computer readable medium of claim 6 wherein an application programming interface is exposed to further request whether a user has rights to use a particular portion of the software application.

8. The computer readable medium of claim 5 wherein the issuance license is generated from a set of configuration settings.

9. A method for executing a software application in which different users are authorized to access different portions of the software application, the method comprising:
- locating an issuance license within the software application, the issuance license dividing the software application into a plurality of portions and identifying, for each portion, each user that is authorized to access the portion, wherein each portion includes a function within the software application;
- requesting by one or more computer processors an end user license from a rights management system, the end user license comprising one or more cryptographic keys and corresponding to a first user and entitling the first user to access each portion of the software application that the issuance license identifies the first user as being authorized to access, wherein the issuance license is used to request the end user license; and
- using by the one or more computer processors the end user license to decrypt each portion of the software application that the issuance license identifies the first user as being authorized to use.

10. The method of claim 9, further comprising:
calling injected logic to check rights associated with the software application.

11. The method of claim 9, further comprising:
presenting an error message to the first user if the first user is unable to access the end user license.

12. The method of claim 9, further comprising:
calling injected logic to decrypt the software application.

13. The method of claim 9,
wherein an application programming interface is exposed to determine whether the first user has rights to access a particular portion of the software application.

* * * * *